United States Patent [19]

Heyer et al.

[11] 4,311,302
[45] Jan. 19, 1982

[54] SHOCK ABSORBER DEVICE

[75] Inventors: Günther Heyer; Karl Kany; Paul Spichala; Felix Wössner; Wilhelm Wecker, all of Schweinfurt, Fed. Rep. of Germany

[73] Assignee: Fichtel & Sachs AG, Schweinfurt, Fed. Rep. of Germany

[21] Appl. No.: 105,092

[22] Filed: Dec. 19, 1979

[30] Foreign Application Priority Data

Dec. 22, 1978 [DE] Fed. Rep. of Germany ....... 2855561

[51] Int. Cl.³ .................. F16F 5/00; B60G 15/08
[52] U.S. Cl. ................... 267/64.23; 188/298; 188/314; 188/322.22; 267/124; 267/64.26
[58] Field of Search .......... 267/64 R, 64 A, 2, 124, 267/127, 120; 188/289, 298, 322, 314; 280/693, 698, 702, 708

[56] References Cited

U.S. PATENT DOCUMENTS

| 3,237,726 | 3/1966 | Deyerling | 267/64 R |
| 3,391,921 | 7/1968 | Axthammer | 267/64 R |
| 4,061,320 | 12/1977 | Warner | 267/64 R |
| 4,153,237 | 5/1979 | Supalla | 267/64 R |
| 4,214,775 | 7/1980 | Taft | 267/64 R |

FOREIGN PATENT DOCUMENTS 1296026 3/1963 Fed. Rep. of Germany .

Primary Examiner—James B. Marbert
Attorney, Agent, or Firm—Toren, McGeady & Stanger

[57] ABSTRACT

In a shock absorber device, a piston rod unit is axially displaceable through a cylindrical member from one end toward the other end thereof. The cylindrical member forms a variable volume working chamber containing a first fluid. A spring chamber is in communication with the working chamber so that the first fluid can flow between the two chambers. A pressurized second fluid is contained within the spring chamber separate from the first fluid and it acts on the first fluid for biasing the piston rod unit out of the working chamber. When the piston rod unit is moved into the working chamber and approaches an inner end position, it forms at least in part a damping chamber which decelerates the movement of the piston rod unit.

57 Claims, 5 Drawing Figures

SHOCK ABSORBER DEVICE

SUMMARY OF THE INVENTION

The present invention is directed to a shock absorber device and, more particularly, to a device incorporating a "soft abutment means".

In the present invention, the shock absorber device includes an axially extending cylindrical member having a first end and a second end spaced apart in the axial direction. A piston rod unit including a piston rod extends into the first end of the cylindrical member. The piston rod unit extends outwardly from the first end of the cylindrical member and is axially displaceable through the cylindrical member from a first position close to the first end of a cylindrical member in which the axial extent of a piston rod forming a part of the piston rod unit is at the minimum axial extent within the cylindrical member. As it moves into the cylindrical member, the piston rod approaches a second end position in which the axial length of the piston rod within the cylindrical member is at the maximum. Within the cylindrical member, a working chamber is formed between the piston rod and the opposite end of the cylindrical member. The volume of the working chamber is variable based on the position of the piston rod within the cylindrical member. A spring chamber is in fluid connection with the working chamber and a body of a first fluid fills the working chamber and partially fills the spring chamber. Within the spring chamber, a body of an elastic compressible second fluid is maintained separate from the first fluid and provides a biasing action on the first fluid so that it tends to maintain the position of the piston rod in its first end position.

Such shock absorber devices are in particular use for the spring suspension of vehicle wheels with respect to the frame of the vehicle.

Such shock absorber devices are used to prevent hard shocks when the piston rod unit approaches its second end position. Such hard shocks are usually encountered when a vehicle embodying such a shock absorber device travels over uneven ground.

It is the primary object of the present invention to prevent the occurrence of such hard shocks by a so-called "soft abutment means", such means becoming effective when the piston rod unit approaches its second end position within the cylindrical member.

In accordance with the present invention, a damping chamber is formed in communication with the working chamber. The damping chamber is filled with the first fluid and is in communication with the working chamber through a passageway and, in addition, is also in communication with the first fluid in the spring chamber. The passageway provides a throttling action on the first fluid within the damping chamber. Accordingly, as the piston rod approaches its second end position the first fluid within the damping chamber is expelled through the passageway which affords the throttling action.

Soft abutment means of this type are known in vehicle shock absorbers. These known shock absorbers, however, do not use a pressurized second fluid. Rather, the spring chamber in the known shock absorbers utilize a balancing chamber containing a gas at substantially atmospheric pressure. The gas in the biasing chamber is only slightly compressed when the piston rod is in its innermost position due to the volume of the piston rod required in such innermost position (see German Auslegeschrift No. 12 96 026).

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE INVENTION

Figure 1:
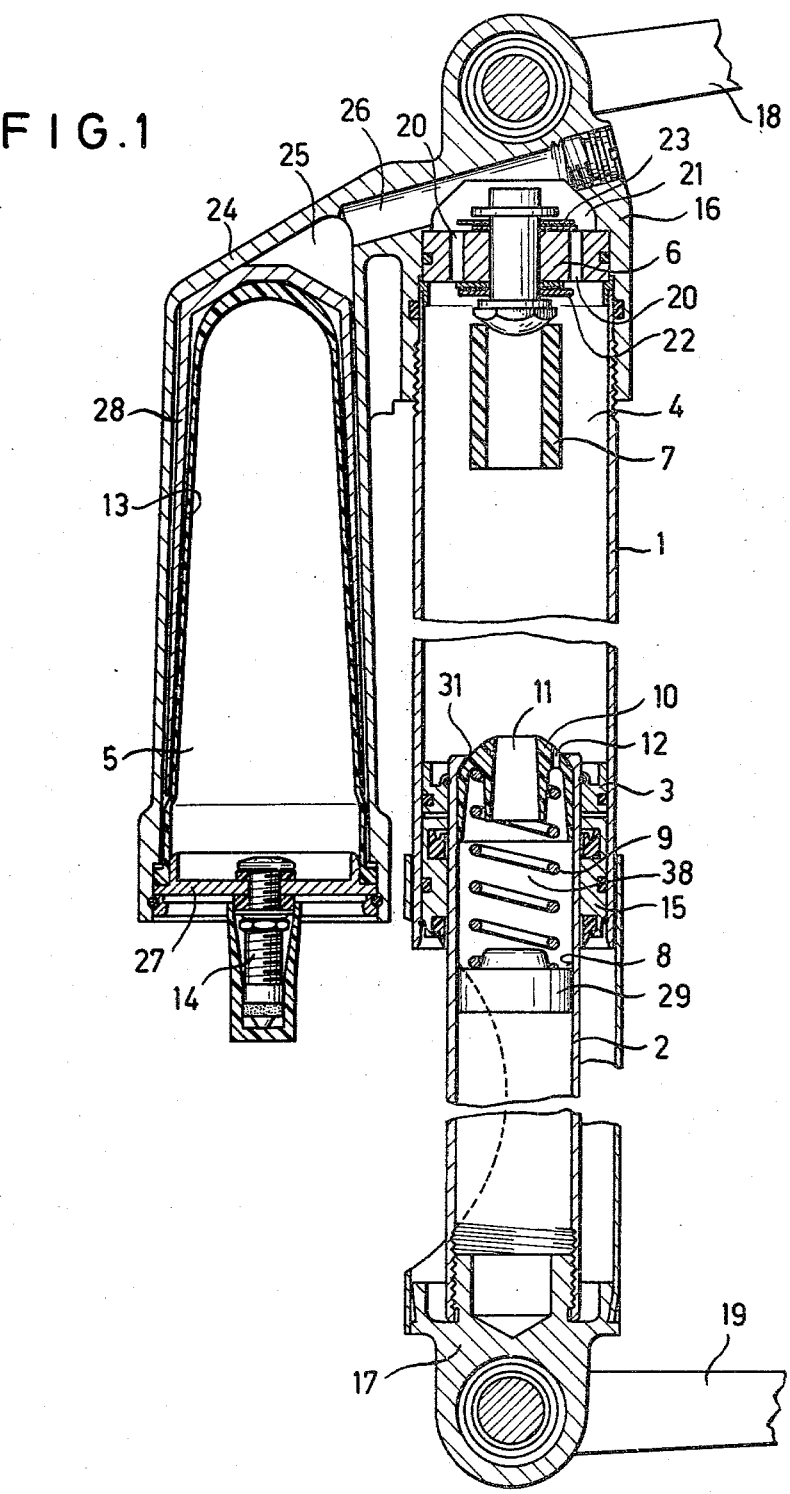
FIG. 1 is an axially extending section through a first embodiment of the shock absorber device incorporating the present invention.

In FIG. 1, an axially elongated cylindrical member 1 is shown having a lower first end and an upper second end. Located within the first end of the cylindrical member 1 is a piston rod guiding and sealing unit 15. A piston rod 2 extends through the piston rod guiding and sealing unit 15 and, as viewed in FIG. 1, projects outwardly from the lower first end of the cylindrical member. The piston rod 2 is a hollow tube. A cap member 16 is fitted onto the upper second end of the cylindrical member 1. The end of the piston rod 2 located outwardly from the cylindrical member 1 is provided with a connecting member 17. Cap member 16 is pivotally connected to a frame member 18 of a vehicle, such as a motorcycle, while connecting member 17 is pivotally connected to a part 19, which may be fixed to the wheel axis of the rear wheel of the vehicle.

The interior of the cylindrical chamber 1 forms a working chamber 4 containing a fluid, such as a conventional hydraulic oil. The upper end of the working chamber 4 is defined by a damping wall 6 extending across the upper end of the cylindrical member 1. Damping wall 6 contains damping bores 20 communicating between the upper end of working chamber 4 and a connecting chamber 21 formed in the cap member 16 above the damping wall 6. Damping bores 20 are closed at their opposite ends by damping springs 22, 23. The damping springs are deflectible by the fluid pressure in the working chamber 4 and the connecting chamber 21.

Formed integrally with the cap member 16 is a spring housing 24. Spring housing 24 defines a spring chamber 25. Spring chamber 25 is in communication with the connecting chamber 21 via a connecting channel 26. A substantially conically shaped membrane 13 is secured within the spring chamber 25 and separates the spring chamber into a gas chamber 5 located within the membrane 13 and the portion of the spring chamber in the upper end of the housing communicating with the working chamber 4 through the damping bores 20. Membrane 13 seals the gas chamber 5 from the remainder of the spring chamber 25. The lower end of the housing 24 contains a cover 27 provided with a filling valve 14. The cover 27 defines the bottom of the gas chamber 5. A cage 28 separates the membrane 13 from the inside wall of the spring housing 24.

Gas chamber 5 contains a fluid or gas at superatmospheric pressure, for instance at 6–10 bar, when the spring device is not under load; in operation under load this pressure may rise up to 100–150 bar. The pressure of the body of gas within the membrane 13 acts on the fluid contained in the remainder of the spring chamber 25 and through the connecting channel 26, the connecting chamber 21, and the damping bores 20, it acts on the fluid within the working chamber 4. As a result, the pressure transmitted from the gas chamber 5 to the fluid in the working chamber 4 biases the piston rod 2 toward the lower first end of the cylindrical member 1. A piston 3 is fixed to the end of the piston rod 2 located within the lower end of the working chamber 4, as viewed in FIG. 1, and the force acting on the piston rod is proportional to the pressure and the cross sectional area of the piston 3.

The upper end of the hollow tubular body of the piston rod 2 forms a damping cylinder 8 defining a damping chamber 38. A wall chamber 29 extending transversely across the lower end of damping cylinder 8 forms the bottom of the damping chamber 38. The upper end of the damping cylinder 38 is open and a damping piston 10 is slidably mounted in the open upper end. A helical compression spring 9 is located within the damping chamber 38 with its lower end bearing against the wall member 29 and its upper end in contact with the damping piston 10. Spring 9 biases the damping piston 10 into its uppermost position within the damping cylinder 8. This uppermost position is defined by an inwardly directed annular abutment shoulder 31 formed at the upper end of the tubular piston rod 2. Damping piston 10 has a central aperture 11 providing communication between the interior of the damping chamber 38 and the working chamber 4. Further, a throttled damping passage 12 extends through the damping piston in an eccentric position relative to the axis of the cylindrical member 1.

When the described shock absorber device is subjected to an external compressive load, piston rod 2 moves into the cylindrical member 1 toward the opposite end covered by the cap member 16. The position shown in FIG. 1 indicates generally the minimum insertion of the piston rod 2 into the working chamber 4. As the piston rod moves upwardly as viewed in FIG. 1, the fluid contained in the working chamber flows through the damping bores 20 into the connecting chamber 21 and then through the connecting channel 26 into the spring chamber 25 where this fluid flows around the outer surface of the elastic membrane 13 counteracting the pressurized gas in the gas chamber 5 within the membrane. The pressure in the gas chamber 5 of, for example, 20 atmospheres, is adjusted so that in normal operation the damping piston 10 does not reach a pushing member 7 fixed to and extending downwardly into the working chamber 4 from the damping wall 6 at the second end of the cylindrical member. If, however, an excessive load is exerted on the shock absorber device, such as when a vehicle incorporating the shock absorber device rolls over very uneven ground, the piston rod 2 may be displaced with such force into the cylindrical member 1 that the damping piston 10 contacts the pushing member 7. When the convex upper face of the damping piston 10 contacts the pushing member 7, the central aperture 11 is closed by the pushing member cutting off any flow of fluid out of the damping chamber 38 except through the throttled passage 12. Passage 12 is positioned radially outwardly from the pushing member 7 so that it is not closed. As the piston rod continues to move toward the upper end of the cylindrical member 1, the damping piston 10 is moved in the opposite direction by the pushing member sliding downwardly into the damping chamber 38. As a result, the volume of the damping chamber decreases with the flow of the fluid within the chamber flowing out through the throttled passage 12. As the damping piston 10 is moved downwardly into the damping chamber 38, the spring 9 is compressed. Because of the throttled damping passage 12, the fluid in the damping chamber 38 is expelled slowly into the working chamber. Due to the throttled flow of the fluid out of the damping chamber 38, damping piston 10 moves very slowly into the upper end of the piston rod and the further movement of the piston rod toward the upper end of the cylindrical member is decelerated. The apparatus affording this decelerating action is the "soft abutment means" mentioned above.

After the force causing the contact of the damping piston 10 with the pushing member 7 no longer acts on the shock absorber device, the force transmitted from the gas enclosed within the chamber 5 acts through the fluid in the spring chamber 25 and the working chamber 4 for returning the piston rod toward its first end position where the minimum length of the piston rod extends into the lower end of the cylindrical member 1. As the damping piston 10 moves out of contact with the pushing member 7 the movement of the damping piston to the upper end of the damping cylinder 8 is not braked to any extent, because of the pushing member 7 and the combination of the helical compression spring 9, the damping piston 10 and the central aperture 11 cease to act as a check valve. As the piston rod moves downwardly, as viewed in FIG. 1, toward the lower first end of the cylindrical member 1, the damping piston 10 under the action of the helical compression spring 9 returns to the position as shown in FIG. 1. Accordingly, the highly pressurized fluid within the working chamber 4 enters into the aperture 11 passing through the space between the pushing member 7 and the damping piston 10 and flows into the damping chamber 38 filling the whole volume of the damping chamber in a rapid manner without any damping action.

Figure 2:
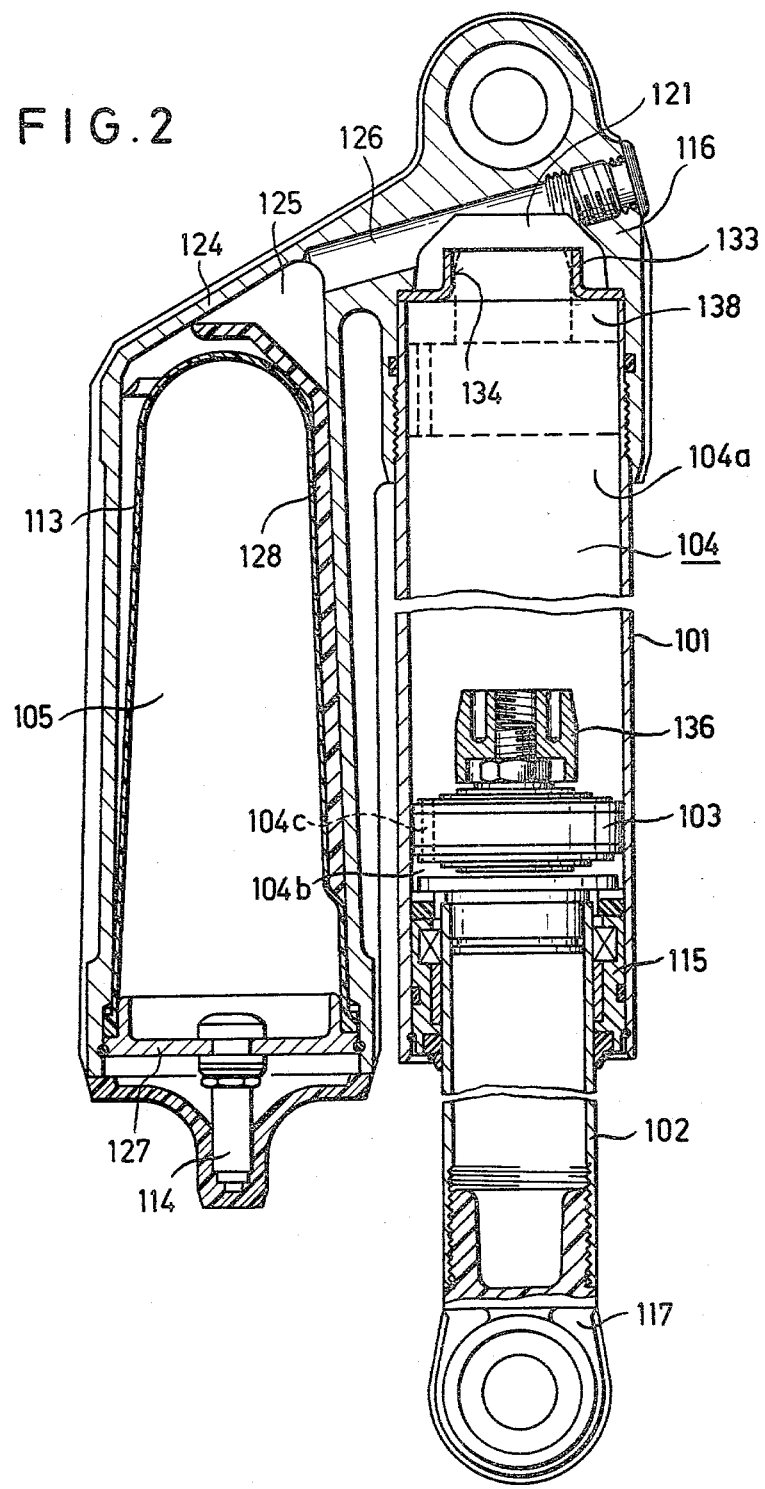
FIG. 2 is a sectional view similar to FIG. 1 through a second embodiment.

In FIG. 2, the second embodiment of the shock absorber device is similar to the embodiment shown in FIG. 1. Similar parts in FIG. 2 are designated by the same reference numerals used in FIG. 1 by adding 100. In the embodiment of FIG. 2, during normal operation there is no damping action between the working chamber 104 and the spring chamber 125. The working chamber 104 is subdivided by a piston 103 mounted on the upper end of the piston rod 102 into an upper compartmemt 104a and a lower annular compartment 104b. Compartments 104a and 104b are interconnected by throttled liquid exchange bores 104c which traverse the piston 103 in its axial direction. When a compressive load is exerted on piston rod 102 it moves upwardly from the position shown in FIG. 2 and the fluid within the working chamber 104 flows into the spring chamber 125 through the connecting chamber 121 and the connecting channel 126. At the same time the fluid flows from the compartment 104a through the liquid exchange bores 104c into the lower compartment 104b, affording a damping effect.

At the upper end of the cylindrical member 101, an annular passage member forms a passage aperture 134 between the upper end of the working chamber and the connecting chamber 121. A flow throttling member 126 extends upwardly from the upper end of piston 103 and has an outside diameter slightly smaller than the inside diameter of the passage aperture 134. As the piston rod 102 moves from its first end position and approaches its second end position at the upper end of the cylindrical member 101, the throttling member 136 starts to enter into the passage aperture 134 so that a narrow gap is formed between the throttling member and the passage aperture. This narrow gap interconnects the upper end of the working chamber 104 and the connecting chamber 121. As a result, the space remaining in the upper end of the working chamber 104 as the throttling member 26 starts to enter the passage aperture 134 forms the damping chamber 138. The position of the piston 103 and the throttling member 136 are shown in dashed lines in the upper end of the working chamber 104 indicating the manner in which the damping chamber 138 is formed. Due to the upward movement of the piston rod 102 within the cylindrical member 101, an increasing volume of the working chamber 104 is taken up by the piston rod 102. Accordingly, the remaining fluid in the upper end of the working chamber which now forms the damping chamber 138 flows through the narrow gap between the throttling member 136 and the inside surface of the passage aperture 134 into the connecting chamber 121 for flow into the spring chamber 125. Accordingly, the upward movement of the piston rod toward the upper end of the cylindrical member 101 is decelerated as soon as the throttling member 136 starts to move into the passage aperture 134.

It is noted, in the embodiment illustrated in FIG. 2, that no check valve is involved limiting flow from the damping chamber 138. As the piston rod 102 commences its downward movement toward the lower first end of the cylindrical member 101, the throttling member 136 is still located within the passage aperture 134. No check valve action is necessary in this embodiment, because the high pressure acting within the spring chamber 125 is directed against the upper end of the throttling member 136 facilitating the downward movement of the piston rod 102.

Figure 3:
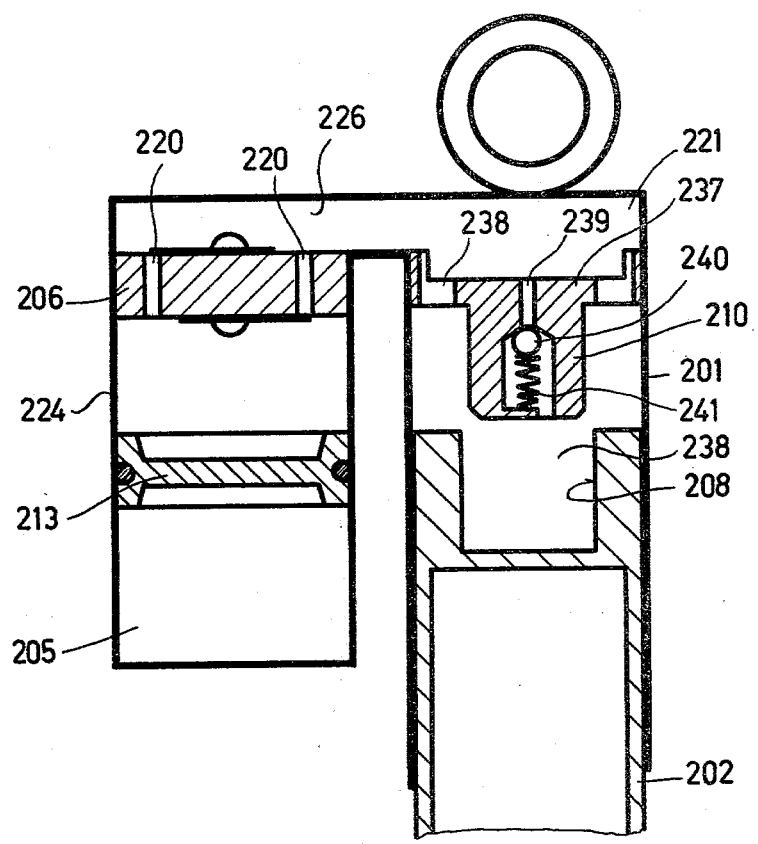
FIG. 3 is a partial axial section of a third embodiment.

In the third embodiment shown in FIG. 3, parts similar to those in FIG. 1 have been represented with the same reference numerals as in FIG. 1 with the addition of 200.

In FIG. 3 the membrane is replaced by a separating piston 213 which is axially movable through the spring housing 224. A damping member or wall 206 extends across the upper end of the spring housing 224 above the piston 213. Damping bores 220 extend through the damping member 206 communicating the space between the lower surface of the damping member 206 and the piston 213 with connecting channel 226. A piston carrier wall 237 is positioned across the upper end of the cylindrical member 201. Piston carrier wall 237 is provided with connecting bores, each having a relatively large cross section so that they do not provide any additional damping effect beyond that provided by the damping bores 220 in the damping member 206. Damping piston 210 is formed on and extends downwardly from the carrier wall 237. The outside diameter of the damping piston 210 is slightly smaller than the inside diameter of a damping cylinder 208 formed in the upper end of the piston rod 202. When the piston rod 202 is displaced upwardly through the cylindrical member and approaches its upper or second end position, the damping chamber starts to move upwardly about the damping piston 210 with a damping chamber 238 being formed inside the damping cylinder 202. Fluid contained within the damping chamber 238 is expelled from the damping chamber through the annular gap formed between the lateral surface of the damping piston 210 and the inside surface of the damping cylinder 208. Accordingly, the final upward movement of the piston rod 202 toward the piston carrier wall 237 is decelerated.

When the piston rod 202 reverses its direction of movement and starts to move downward again, the damping chamber 238 is easily refilled through a bore 239 formed in the piston carrier wall 237. During upward movement of the piston rod 202, the bore 239 is closed by a check valve body 240 by the action of a check valve spring 241. The check valve opens only when the piston rod 202 moves downwardly relative to the cylindrical member 201 allowing the fluid from the connecting chamber 221 to flow into the damping chamber 238.

Figure 4:
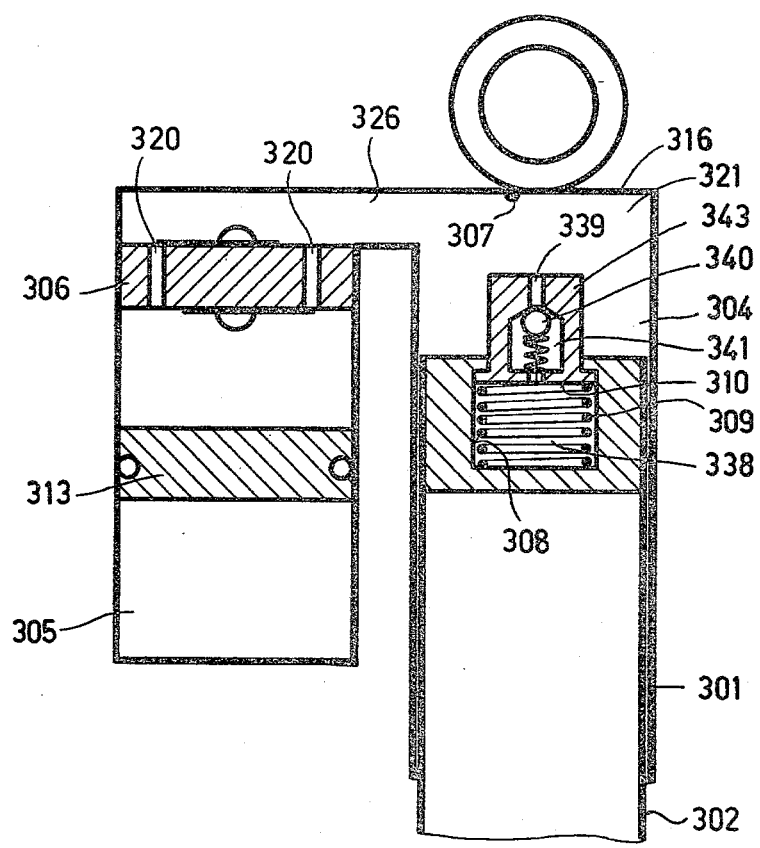
FIG. 4 is a view similar to FIG. 3 illustrating a fourth embodiment.

The fourth embodiment illustrated in FIG. 4 is similar in part to the embodiment of FIG. 1 and in part to the embodiment of FIG. 3. Similar parts with regard to FIG. 1 are identified by the same reference numerals with the addition of 300 and those similar to FIG. 3 have the same reference numerals with the addition of 100.

In FIG. 4 a damping cylinder 308 is located within the closed upper end of the piston rod 302. A damping piston 310 is slidably mounted within the cylinder 308 for movement in the axial direction of the cylindrical member 301. A helical compression spring 309 is located within the damping cylinder 308 biasing damping piston 310 upwardly out of the damping cylinder. As viewed in FIG. 4, an extension 343 extends upwardly from the damping piston 310 toward the upper end of the cylindrical member 301. The combination of the damping piston 310 and the extension 343 define, in combination with the upper end of the piston rod 302, a throttled passage for fluid extending between the damping chamber 308 and the working chamber 304. As the piston rod 302 approaches its uppermost position, that is the second end position, the extension member 343 abuts against the pushing member 307 causing the damping piston to move downwardly relative to the upper end of the piston rod 302 so that the inward movement of the damping piston into the damping chamber causes the fluid within the chamber to be expelled through the throttled passage formed by the gap defined between the damping piston 310 and the damping cylinder 308 into the working chamber 304. It would be possible to eliminate the pushing member 307 so that the extension 343 would contact the inner surface of the cap 316 and cause the damping piston 310 to be displaced into the damping chamber 338. Accordingly, as the extension 343 commences contact with the pushing member 307, the throttled flow of fluid out of the damping chamber 338 causes a deceleration of the upward movement of the piston rod 302. A check valve defined by a bore 339 in the extension 343, by a check valve body 340 and a check valve spring 341 permits rapid refilling of the damping chamber 338 when the piston rod starts its downward movement toward its first end position, whereby the downward movement of the piston rod 302 is not damped.

Figure 5:
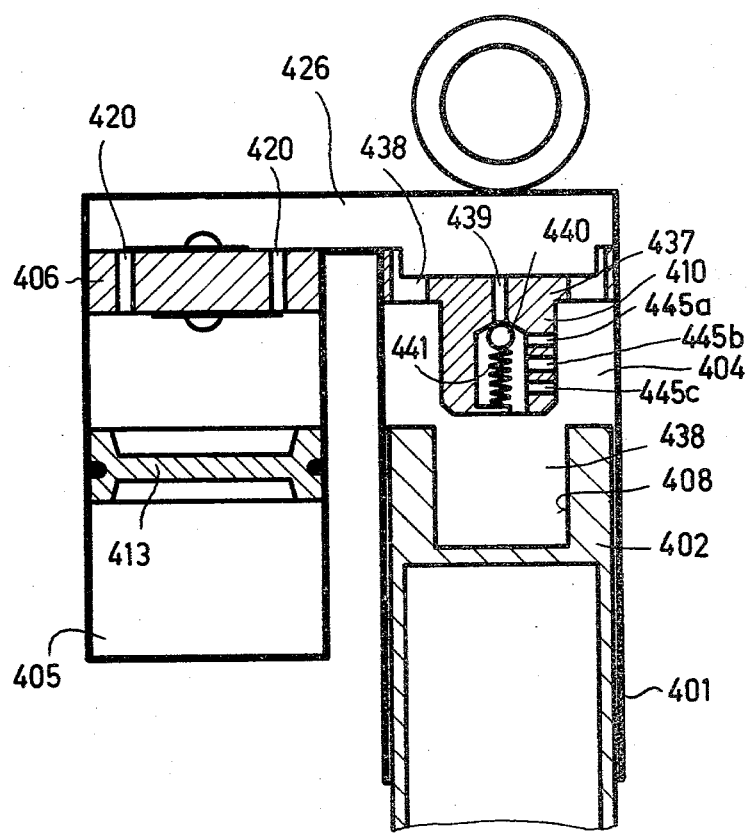
FIG. 5 is a partial axial section, similar to FIGS. 3 and 4, showing a fifth embodiment.

The embodiment in FIG. 5 is very similar to the embodiment in FIG. 3 and similar parts are designated by the same reference numerals, however, the reference numerals used in FIG. 5 are increased by 200 over those used in FIG. 3.

The only difference between FIGS. 3 and 5 is that in FIG. 5 the throttled passage connecting the damping chamber 438 and the working chamber 404 consists of a plurality of damping bores 445a, 445b and 445c. As the damping piston 410 commences its downward movement relative to the damping chamber 438, initially the three damping bores 445a, 445b and 445c are open between the chamber 438 and the working chamber 404. In turn, the damping bores are closed as the damping chamber 438 moves in a telescoping manner over the downwardly projecting part of the damping piston 410. Accordingly, the total cross sectional area of the throttling passage arrangement is decreased in a step-wise manner and similarly, the decelerating action is increased in a step-wise manner, as the piston rod approaches its uppermost or second end position within the cylindrical member 401.

When employed with a two-wheel vehicle, such as a motorcycle, shock absorber devices may be placed on both sides of the rear wheel for obtaining a shock absorbing and damping action between the frame and the rear wheel.

In the embodiment illustrated in FIG. 5, the damping bores 445a, 445b and 445c may be replaced by a single bore located, for example, at the position of bore 445c in combination with a groove in the outer surface of the damping piston 410. The groove would be connected to the single bore and extend toward the piston carrier wall 410a. The groove would have a decreasing cross section in the direction approaching the piston carrier wall 410a. As a result, with such an arrangement, the damping effect would be continuously increased as the piston rod approaches its second end position.

With regard to FIG. 1, the cross section of the throttle bore 12 through the piston 10 can be precisely sized for exactly defining the damping action when the "soft abutment means" becomes effected. The point at which the soft abutment means becomes effective can be varied by varying the length of the pushing member 7. Further, by varying the helical compression spring 9, it is possible to vary the spring and damping characteristic. In the second embodiment displayed in FIG. 2, the passage member 133 can be replaced by a simple annular disc.

Further, with regard to FIG. 2, the cross sectional shape of the throttle member 136 can be substantially equal to that of the piston rod 102 and the throttle member 136 can have a cross sectional area equal to at least 50% and preferably at least 70% of the cross sectional area of the piston rod 102.

In the second embodiment, the passage member 133 and the throttle member 136 may be slightly movable in the radial direction with respect to the axis of the cylindrical member and the piston 103, to allow for self-alignment of these parts. The frusto-conical configuration of the upper lateral surface of the throttle member 136 assists in such a self-aligning effect.

While specific embodiments of the invention have been shown and described in detail to illustrate the application of the inventive principles, it will be understood that the invention may be embodied otherwise without departing from such principles.

What is claimed is:

1. A shock absorber device comprising an axially elongated cylindrical member having a first end and a second end spaced apart in the axial direction thereof, a piston rod unit including an axially elongated piston rod extending into said cylindrical member through the first end thereof, said piston rod extending outwardly from the first end of said cylindrical member, said piston rod being movable in the axial direction of said cylindrical member between a first end position where the minimum axial length of said piston rod extends through the first end into said cylindrical member and a second end position where the maximum axial length of said piston rod extends through said first end into said cylindrical member toward said second end thereof, said cylindrical member forming a variable volume working chamber therein with the volume depending on the position of said piston rod between the first and second end positions, a spring chamber, means for forming a flow passageway connecting said spring chamber to said working chamber in said cylindrical member, said working chamber and said spring chamber being arranged to hold a body of a first fluid which fills said working chamber and partially fills said spring chamber, means in said spring chamber arranged to be contacted by the first fluid for transmitting pressure to the first fluid in said spring chamber and therefrom to said working chamber for biasing said piston rod toward the first end of said cylindrical member, means for forming at least a part of a damping chamber in fluid flow communication with said working chamber the volume of said damping chamber being reduced only when said piston rod passes an intermediate position between said first and second end positions in moving toward said second end of said cylindrical member, said means forming at least a part of said damping chamber arranged to form at least in part a throttled passageway communicating between said working chamber and said damping chamber so that a throttled flow of the first fluid flows from said damping chamber into said working chamber only when said piston rod passes said intermediate position between said first and second end positions in moving toward the second end of said cylindrical member.

2. A shock absorber device, as set forth in claim 1, wherein said means in said spring chamber arranged to be contacted by the first fluid comprises a displaceable body within said spring chamber dividing the volume therein into a first subchamber arranged to receive the first fluid from said flow passageway and a second subchamber separated from said first subchamber, said second subchamber being arranged to receive a pressurized second fluid for transmitting pressure through said displaceable body to the first fluid arranged to be contained in said first subchamber.

3. A shock absorber device, as set forth in claim 2, wherein said displaceable body comprises a conically shaped elastic member forming said second subchamber within said elastic body, said elastic body arranged to receive a supply of pressurized gas as the pressurized second fluid.

4. A shock absorber device, as set forth in claim 2, wherein said displaceable body comprises a piston displaceable through said spring chamber and separating said spring chamber into said first and second subchambers.

5. A shock absorber device, as set forth in claim 1, wherein said flow passageway interconnects the second end of said cylindrical member with said spring chamber.

6. A shock absorber device, as set forth in claim 5, wherein a housing is connected to the second end of said cylinder member by said means forming the flow passageway.

7. A shock absorber device, as set forth in claim 6, wherein said housing is located spaced outwardly from and extending coextensively with said cylindrical member.

8. A shock absorber device, as set forth in claim 7, wherein said housing is a tubular shaped member with the axis thereof disposed in substantially parallel relation with the axis of said cylinder member.

9. A shock absorber device, as set forth in claim 1, wherein said means forming said damping chamber comprises a damping piston fitted within the end of said piston rod inserted into the first end of said cylindrical member, said piston defining a wall separating said damping chamber from said working chamber, an opening through said piston affording fluid communication between said working chamber and said damping chamber, and means within said working chamber for combining with said piston and forming a check valve for blocking flow through said passage in said piston when said piston rod reaches said second end position.

10. A shock absorber device, as set forth in claim 1, wherein flow damping means being provided at the second end of said cylindrical member between said working chamber and said connecting passageway for limiting flow therebetween.

11. A shock absorber device, as set forth in claim 1, wherein said means for forming at least a part of a damping chamber comprises a piston mounted on the end of said piston rod inserted into the first end of said cylindrical member and said piston extending from said piston rod toward the second end of said cylindrical member, said piston extending into said working chamber and dividing said working chamber into a first compartment extending between said piston and the second end of said cylindrical member and a second annular compartment located between said piston and the end of said piston rod inserted into the first end of said cylindrical member.

12. A shock absorber device, as set forth in claim 11, wherein said first compartment forms said working chamber.

13. A shock absorber device, as set forth in claim 11, wherein said first and second compartments form said working chamber and said piston having a flow passage therethrough affording fluid communication between said first and second compartments.

14. A shock absorber device, as set forth in claim 13, wherein said flow passageway through said piston is sized for throttling flow between said first and second compartments.

15. A shock absorber device, as set forth in claim 1, wherein said piston rod is a tubular member, said means for forming at least a part of a damping chamber comprises a piston mounted within said tubular piston rod at the end of said piston rod inserted into the first end of said cylindrical member, said piston being axially movable relative to said piston rod for movement therein away from and toward the end of said piston rod inserted into the first end of said cylindrical member, and means adjacent the second end of said cylindrical member for contact with said piston when said piston rod moves into the second end position.

16. A shock absorber device, as set forth in claim 15, wherein a wall member positioned within said tubular piston rod and spaced from said piston and forming therebetween within said piston rod said damping cylinder, biasing means located within said damping cylinder and in contact with said piston for biasing said piston toward the end of said piston rod inserted into the first end of said cylindrical member, a pushing member mounted within said cylindrical member adjacent the second end thereof and extending axially therein toward said first end of said cylindrical member, said pushing member arranged to engage said piston on said piston rod as said piston rod approaches said second end position for displacing said damping piston toward said wall member in said piston rod.

17. A shock absorber device, as set forth in claim 16, wherein a passage formed in said piston in alignment with said pushing member, said passage in said piston being closable by said pushing member when said piston contacts said pushing member so that said piston and said pushing member in combination with said biasing means form a check valve for said passage.

18. a shock absorber device, as set forth in claim 1, wherein said means for forming at least a part of the damping chamber comprises a damping piston mounted adjacent the second end of said cylindrical member with said damping piston projecting in the axial direction of said cylindrical member toward the first end thereof, said piston member being spaced radially inwardly from the inner surface of said cylindrical member, and said piston rod being closed at the end thereof inserted into the first end of said cylindrical member and having an axially extending recess in the closed end of said piston rod in alignment with said piston so that said piston is positioned within said recess when said piston rod is moved into the second end position, the outside diameter of said piston being slightly less than the inside diameter of said recess so that a damping passageway is formed therebetween when said piston enters into said recess as said piston rod moves into the second end position.

19. A shock absorber device, as set forth in claim 1, including a vehicle frame supporting a wheel axle, said cylindrical member being connected to said frame and said piston rod being connected to said wheel axle.

20. A shock absorber device comprising an axially elongated cylindrical member having a first end and a second end spaced apart in the axial direction thereof, a piston rod unit including an axially elongated piston rod extending into said cylindrical member through the first end thereof, said piston rod extending outwardly from the first end of said cylindrical member, said piston rod being movable in the axial direction of said cylindrical member between a first end position where the minimum axial length of said piston rod extends through the first end into said cylindrical member and a second end position where the maximum axial length of said piston rod extends through said first end into said cylindrical member toward said second end thereof, said cylindrical member forming a variable working chamber therein with the volume depending on the position of said piston rod between the first and second end positions, a spring chamber, means for forming a flow passageway connecting said spring chamber to said working chamber in said cylindrical member, said working chamber and said spring chamber being arranged to hold a body of a first fluid which fills said working chamber and partially fills said spring chamber, means in said spring chamber arranged to be contacted by the first fluid for transmitting pressure to the first fluid in said spring chamber and therefrom to said working chamber for biasing said piston rod toward the first end of said cylindrical member, means for forming at least a part of a damping chamber in fluid flow communication with said working chamber the volume of said damping chamber being reduced only when said piston rod passes an intermediate position between said first and second end positions in moving toward said second end of said cylindrical member, said means forming at least a part of said damping chamber arranged to form at least in part a throttled passageway communicating between said working chamber and said damping chamber so that a throttled flow of the first fluid flows from said damping chamber into said working chamber only when said piston rod passes said intermediate position between said first and second end positions in moving toward the second end of said cylindrical member, said means for forming at least a part of the damping chamber comprises a tubular shaped member positioned at the second end of said cylindrical member, a piston mounted on the end of said piston rod inserted into the first end of said cylindrical member, said tubular member forming a passageway, a throttle member mounted on said piston and extending in the axial direction of said cylindrical member toward the second end of said cylindrical member, said throttle member being movable into said passage within said tubular member when said piston rod moves into the second end position and said damping chamber being formed by said throttle member of said tubular member and the portion of said cylindrical member adjacent said second end thereof when said throttle member commences movement into said tubular member as said piston rod approaches the second end position, and said throttle member being slightly smaller in diameter than the inside diameter of said tubular member so that the annular space therebetween form the throttling passage between said damping chamber and said connecting passage at the second end of said cylindrical member.

21. A shock absorber device comprising an axially elongated cylindrical member having a first end and a second end spaced apart in the axial direction thereof, a piston rod unit including an axially elongated piston rod extending into said cylindrical member through the first end thereof, said piston rod extending outwardly from the first end of said cylindrical member, said piston rod being movable in the axial direction of said cylindrical member between a first end position where the minimum axial length of said piston rod extends through the first end into said cylindrical member and a second end position where the maximum axial length of said piston rod extends through said first end into said cylindrical member toward said second end thereof, said cylindrical member forming a variable volume working chamber therein with the volume depending on the position of said piston rod between the first and second end positions, a spring chamber, means for forming a flow passageway connecting said spring chamber to said working chamber in said cylindrical member, said working chamber and said spring chamber being arranged to hold a body of a first fluid which fills said working chamber and partially fills said spring chamber, means in said spring chamber arranged to be contacted by the first fluid for transmitting pressure to the first fluid in said spring chamber and therefrom to said working chamber for biasing said piston rod toward the first end of said cylindrical member, means for forming at least a part of a damping chamber in fluid flow communication with said working chamber the volume of said damping chamber being reduced only when said piston rod passes an intermediate position between said first and second end positions in moving toward said second end of said cylindrical member, said means forming at least a part of said damping chamber arranged to form at least in part a throttled passageway communicating between said working chamber and said damping chamber so that a throttled flow of the first fluid flows from said damping chamber into said working chamber only when said piston rod passes said intermediate position between said first and second end positions in moving toward the second end of said cylindrical member, said means for forming at least a part of the damping chamber comprises a damping piston mounted adjacent the second end of said cylindrical member with said damping piston projecting in the axial direction of said cylindrical member toward the first end thereof, said piston member being spaced radially inwardly from the inner surface of said cylindrical member, and said piston rod being closed at the end thereof inserted into the first end of said cylindrical member and having an axially extending recess in the closed end of said piston rod in alignment with said piston so that said piston is positioned within said recess when said piston rod is moved into the second end position, the outside diameter of said piston being slightly less than the inside diameter of said recess so that a damping passageway is formed therebetween when said piston enters into said recess as said piston rod moves into the second end position, said damping piston forming a blind bore open at the end thereof closer to the first end of said cylindrical member, said bore extending in the axial direction of said cylindrical member, a plurality of transverse bores spaced apart in the axial direction of said cylindrical member and extending from said blind bore outwardly through the lateral surface of said piston, said bores providing a variable throttling action as said piston enters into said recess in the end of said piston rod.

22. A spring device comprising
(A) a cylinder member (1) having an axis and two axial ends,
(B) a piston rod unit including a piston rod (2) extending through a first one of said axial ends inward and outward of said cylinder member (1) and axially movable with respect to said cylinder member (1), between a first terminal position, in which the axial extent of said piston rod within said cylinder member (1) is at a minimum and a second terminal position, in which the axial extent of said piston rod (2) within said cylinder member (1) is at maximum,
(C) a working chamber (4) within said cylinder member (1), the volume of said working chamber (4) being variable in dependency of the axial position of said piston rod (2) with respect to said cylinder member (1),
(D) a spring chamber (25),
(E) liquid connection means (21,26) connecting said working chamber (4) and said spring chamber (25),
(F) a body of liquid filling said spring chamber (25),
(G) an elastically compressible body (13) within said spring chamber (25) pressurizing said liquid in said spring chamber (25) and in said working chamber (4), so as to bias said piston rod (2) toward said first terminal position, (H) said working chamber (4) is adjacent the second axial end of said cylinder member (1) and said liquid connecting means (21,26) are connected to that end of said working chamber (4), which is adjacent said second axial end of said cylinder member (1), (I) a damping cylinder (8) provided in the inner end of said piston rod unit within said cylinder member (1) and said damping cylinder (8) defining a damping chamber (38), said damping cylinder (8) is open toward the second axial end of said cylinder member (1), and by a damping piston member (10) axially movable with respect to said damping cylinder (8) and entering into said damping cylinder (8) only when said piston rod (2) passes an intermediate position in approaching said second terminal position, (J) said damping piston member (10) is in continuous engagement with the open end of said damping cylinder (8), biasing means (9) are provided on said piston rod unit for biasing said damping piston member (10) toward the inner end of said piston rod unit and a pushing member (7) is provided adjacent the second axial end of said cylinder member (1), said pushing member (7) engaging said damping piston member (10) only when said piston rod (2) approaches said second terminal position, so as to push said damping piston (10) towards the outer end of said piston rod unit, and first throttled passage means (12) being provided between said damping chamber (38) and said working chamber (4) allowing liquid to escape from said damping chamber (38) to said working chamber (4).

23. A spring device as set forth in claim 22, wherein said elastic compressible body (5) is defined by a body of gas.

24. A spring device as set forth in claim 23, wherein an elastically deformable membrane separates said body of gas (5) from said body of liquid.

25. A spring device as set forth in claim 23, wherein a separating piston separates said body of gas (5) from said body of liquid.

26. A spring device as set forth in claim 22, wherein said spring chamber (25) comprising a separate housing (24) fixed to said cylinder member (1).

27. A spring device as set forth in claim 26, wherein said separate housing (24) is provided outside said cylinder member (1) and is axially at least partially co-extensive with said cylinder member (1).

28. A spring device as set forth in claim 27, wherein said separate housing (24) is a substantially tubular housing, the axis of which is substantially parallel to the axis of said cylinder member (1).

29. A spring device as set forth in claim 22, wherein a second passage means (11) connects said damping chamber (38) with said working chamber (4), said second passage means (11) forms a check valve (10,7,9), which allows liquid to enter into said damping chamber (38) when said damping piston member (10) is moved toward the inner end of said piston rod unit by said biasing means (9).

30. A spring device as set forth in claim 29, wherein liquid flow damping means (6,20) are provided between said working chamber (4) and said spring chamber (25).

31. A spring device as set forth in claim 29, wherein said second passage means (11) are defined by an aperture in said damping piston (10), said aperture (11) being closable by said pushing member (7), the check valve formed by said second passage means (10,7,9) being defined by said aperture (11), said pushing member (7) and said biasing means (9).

32. A spring device as set forth in claim 22, including a vehicle frame (18), a vehicle wheel axle (19), said cylinder member (1) is connected to one of said frame and wheel axle and said piston rod unit is connected to the other one of said frame and wheel axle.

33. A spring device as set forth in claim 22, wherein said first throttled passage means (12) are defined by a substantially axially directed bore (12) of said damping piston member (10).

34. A spring device as set forth in claim 22, wherein said first throttled passage means are defined between a radially outer face of said damping piston member (310) and a radially inner face of said damping cylinder (308).

35. A spring device as set forth in claim 29, wherein said check valve (340) comprises a valve member (340) applied to that end of said second passage means (339) which is adjacent said damping chamber (338), and spring means (341) urging said valve member (340) toward said end of said second passage means (339).

36. A spring device comprising (A) a cylinder member (101) having an axis and two axial ends, (B) a piston rod unit including a piston rod (102) extending through a first one of said axial ends inward and outward of said cylinder member (101) and axially movable with respect to said cylinder member (104), between a first terminal position, in which the axial extent of said piston rod (102) within said cylinder member (101) is at a minimum and a second terminal position, in which the axial extent of said piston rod (102) within said cylinder member (101) is at maximum, (C) a working chamber (104) within said cylinder member (101), the volume of said working chamber (104) being variable in dependency of the axial position of said piston rod (102) with respect to said cylinder member (101), (D) a spring chamber (125), (E) liquid connection means (121,126) connecting said working chamber (104) and said spring chamber (125), (E) a body of liquid filling said working chamber (104) and partially filling said spring chamber (125), (G) an elastically compressible body (113) within said spring chamber (125) pressurising said liquid in said spring chamber (125) and in said working chamber (104), so as to bias said piston rod (102) toward said first terminal position, said working chamber (104) is adjacent the second axial end of said cylinder member (104) and said liquid connecting means (121,126) are connected to that end of said working chamber (104), which is adjacent said second axial end of said cylinder member (104), (H) said working chamber (104) is adjacent the second axial end of said cylinder member (104) and said liquid connecting means (121,126) are connected to that end of said working chamber (104), which is adjacent said second axial end of said cylinder member (104), (I) a damping chamber (138) is defined by a part of said working chamber (104), when said piston rod unit approaches said second end of said cylinder member (101), said liquid connection means connecting said working chamber (104) and said spring chamber (125) comprising a passage member (133)

provided adjacent the second end of said cylinder member (101), said passage member (133) defining a passage aperture (134), throttling means defined by a throttling member (136) mounted on said piston rod unit, which throttling member (136) enters into said passage aperture (134) only when said piston rod (102) passes an intermediate position in approaching said second terminal position.

37. A spring device as set forth in claim 36, wherein said elastically compressible body (105) is defined by a body of gas.

38. A spring device as set forth in claim 37, wherein an elastically deformable membrane separates said body of gas (105) from said body of liquid (113).

39. A spring device as set forth in claim 38, wherein a separating piston separates said body of gas (105) from said body of liquid (113).

40. A spring device as set forth in claim 36, wherein said spring chamber (125) comprising a separate housing (124) fixed to said cylinder member (101).

41. A spring device as set forth in claim 40, wherein said separate housing (124) is provided outside said cylinder member (101) and is axially at least partially co-extensive with said cylinder member (101).

42. A spring device as set forth in claim 41, wherein said separate housing (124) is a substantially tubular housing, the axis of which is substantially parallel to the axis of said cylinder member (106).

43. A spring device as set forth in claim 36, wherein a piston (103) is provided on said piston rod unit, which piston (103) separates a first compartment (104a) within said cylinder member (101) adjacent said second end thereof from a second annular compartment (104b) defined by said cylinder member (101) and said piston rod (102).

44. A spring device as set forth in claim 43, wherein said first and second compartments (104a, 104b) define said working chamber (104), and liquid exchanging means (104c) interconnecting said first and second compartments (104a, 104b).

45. A spring device as set forth in claim 44, wherein said liquid exchanging means (104c) are provided with damping means.

46. A spring device as set forth in claim 36 including a vehicle frame, a vehicle wheel axle, wherein said cylinder member (101) is connected to one of said frame and wheel axle and said piston rod unit is connected to the other one of said frame and wheel axle.

47. A spring device comprising
(A) a cylinder member (201) having an axis and two axial ends,
(B) a piston rod unit including a piston rod (202) extending through a first one of said axial ends inward and outward of said cylinder member (201) and axially movable with respect to said cylinder member (201), between a first terminal position, in which the axial extent of said piston rod (202) within said cylinder member (201) is at a minimum and a second terminal position, in which the axial extent of said piston rod (202) within said cylinder member (201) is at maximum,
(C) a working chamber (204) within said cylinder member (201), the volume of said working chamber (204) being variable in dependency of the axial position of said piston rod (202) with respect to said cylinder member (201),
(D) a spring chamber,
(E) liquid connection means (221,226) connecting said working chamber (204) and said spring chamber,
(F) a body of liquid filling said working chamber (204) and partially filling said spring chamber,
(G) an elastically compressible body within said spring chamber pressurizing said liquid in said spring chamber and in said working chamber (204), so as to bias said piston rod (202) toward said first terminal position,
(H) said working chamber (204) is adjacent the second axial end of said cylinder member (201) and said liquid connecting means (221,226) are connected to that end of said working chamber (204), which is adjacent said second axial end of said cylinder member (204),
(I) a damping cylinder (208) provided in the inner end of said piston rod unit within said cylinder member (201) and said spring cylinder defining a damping chamber, said damping cylinder (208) is open toward the second axial end of said cylinder member (201), and by a damping piston member (210) axially movable with respect to said damping cylinder (208) and entering into said damping cylinder (208) only when said piston rod (202) passes an intermediate position in approaching said second terminal position,
(J) said damping piston (210) is provided at the second of said cylinder member (201), said damping piston member (210) and said damping cylinder defining first throttled passage means between said damping chamber (238) and said working chamber (204) allowing liquid to escape from said damping chamber (238) to said working chamber (204), when said damping piston member (210) enters into said damping cylinder (208).

48. A spring device as set forth in claim 47, wherein said elastically compressible body (205) is defined by a body of gas.

49. A spring device as set forth in claim 48, wherein an elastically deformable membrane separates said body of gas (205) from said body of liquid.

50. A spring device as set forth in clain 49, wherein a separating piston separates said body of gas (205) from said body of liquid.

51. A spring device as set forth in claim 47, wherein a separate housing forms said spring chamber and is fixed to said cylinder member (201).

52. A spring device as set forth in claim 51, wherein said separate housing (224) is provided outside said cylinder member (201) and is axially at least partially co-extensive with said cylinder member (201).

53. A spring device as set forth in claim 52, wherein said separate housing (224) is a substantially tubular housing, the axis of which is substantially parallel to the axis of said cylinder member (201).

54. A spring device as set forth in claim 47, wherein second passage means (239) connects said damping chamber (238) with said working chamber (204) and said spring chamber, said second passage means (239) comprising a check valve (240,244), which check valve (240,241) allows liquid to enter into said damping chamber (238) when said damping piston member (210) withdraws from said damping chamber 208.

55. A spring device as set forth in claim 47, wherein liquid flow damping means (220) are provided between said working chamber (204) and said spring member.

56. A spring device as set forth in claim 47, 48, 49, 50, 51, 52, 53, 54 and 55, wherein the flow cross section ($445a+445b+445c$) of said first throttled passage means is responsive to the axial position of said piston rod (402).

57. A spring device as set forth in claims 47, 48, 49, 50, 51, 52, 53, 54 or 55, wherein said cylinder member (1) and said piston rod unit are connected to the frame (18) and to the wheel axle (19) of a vehicle.

* * * * *